June 24, 1930.  J. O. PRESCOTT ET AL  1,766,046
SOUND REPRODUCING SYSTEM
Filed Jan. 7, 1929   3 Sheets-Sheet 3
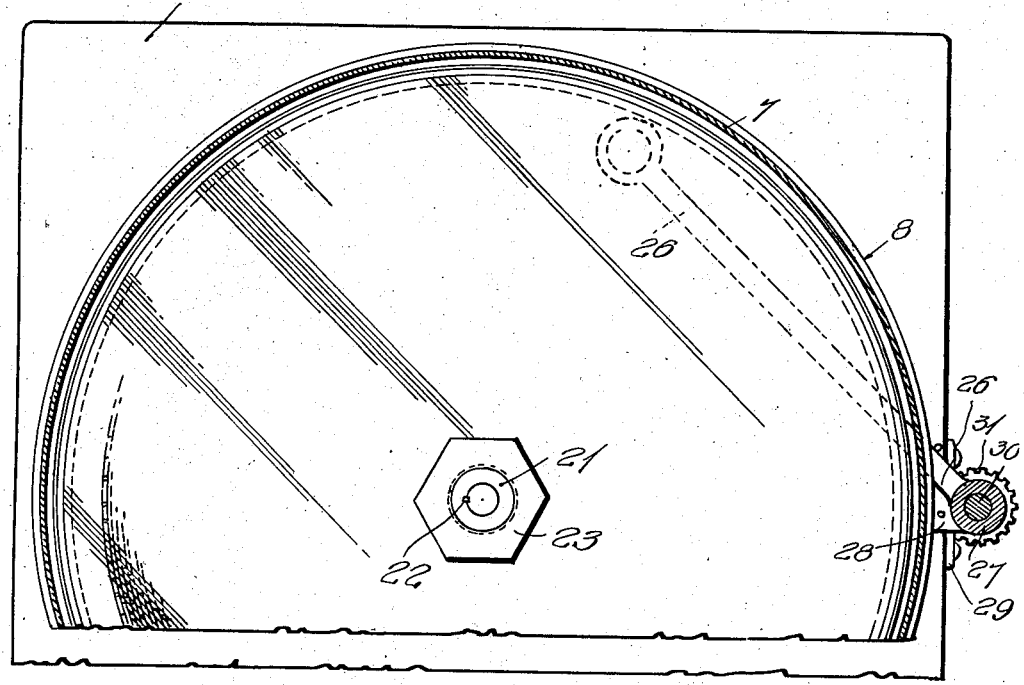
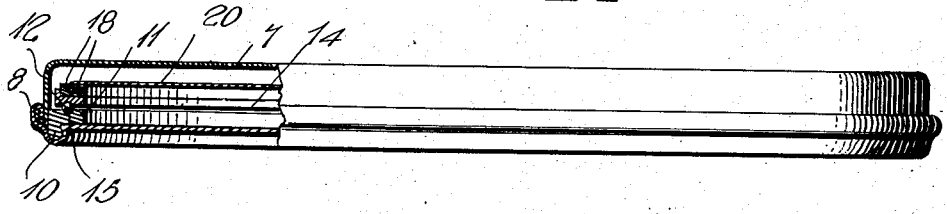
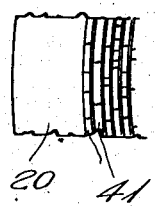
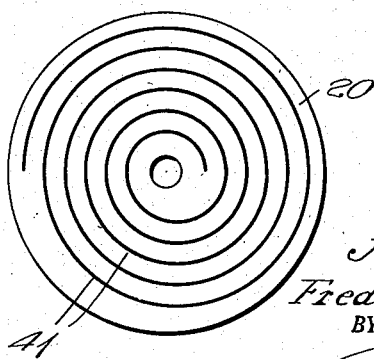
Inventors:
John O. Prescott,
Frederick A. Kolster,
BY John C. Grady
ATTORNEY Patented June 24, 1930

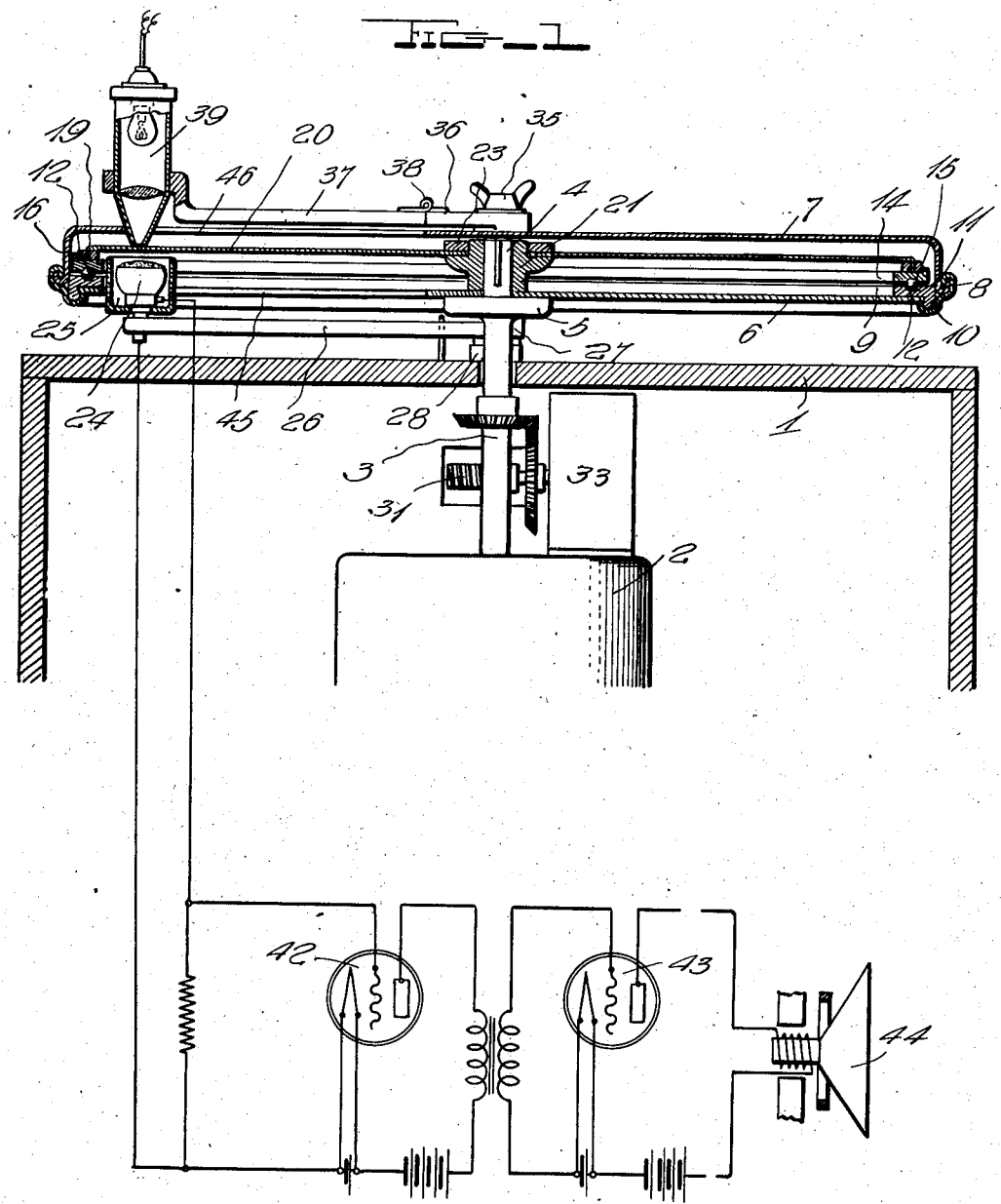

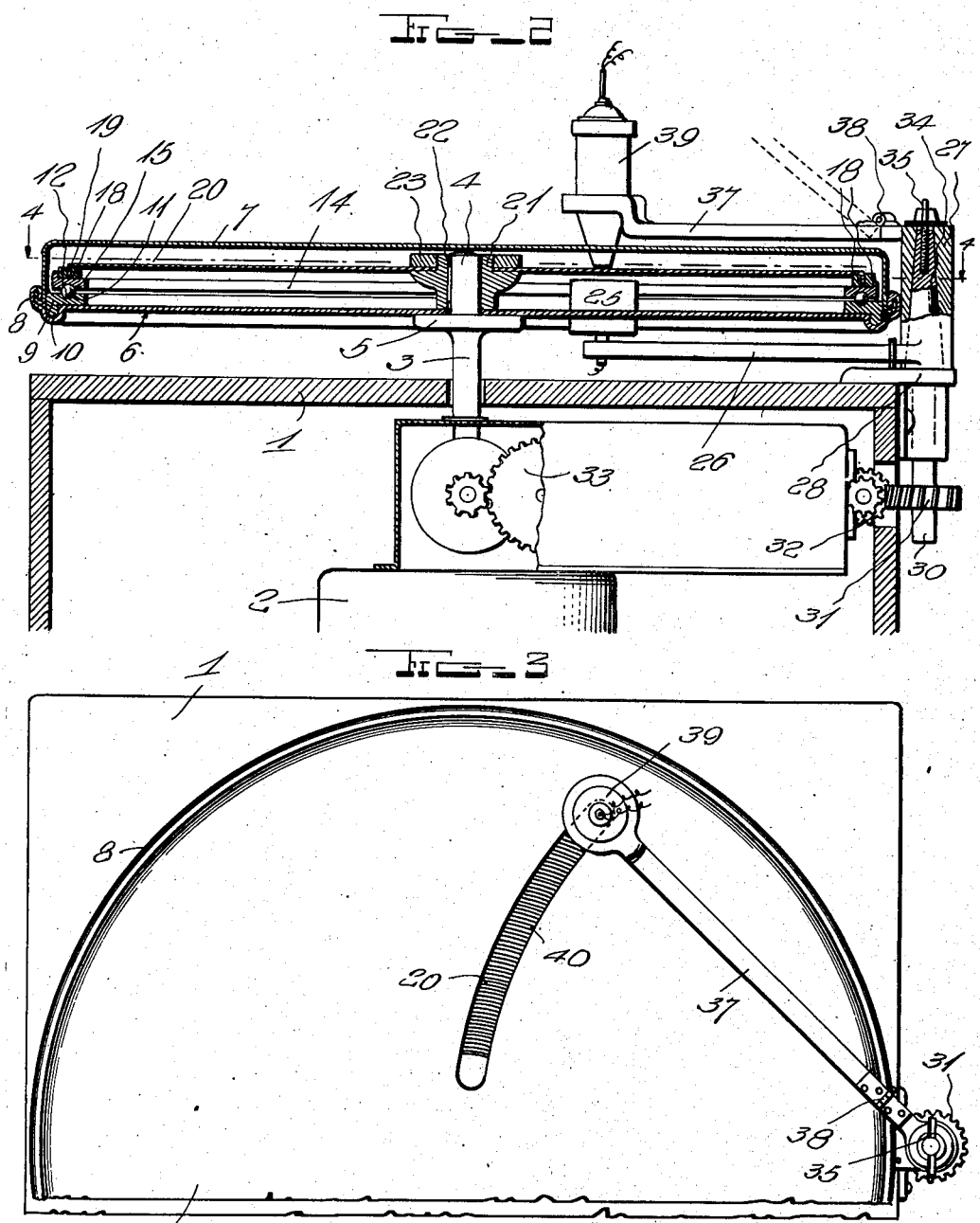

1,766,046

UNITED STATES PATENT OFFICE

JOHN O. PRESCOTT, OF GLENBROOK, CONNECTICUT, AND FREDERICK A. KOLSTER, OF PALO ALTO, CALIFORNIA, ASSIGNORS TO FEDERAL TELEGRAPH COMPANY, OF NEWARK, NEW JERSEY, A CORPORATION OF CALIFORNIA

SOUND-REPRODUCING SYSTEM

Application filed January 7, 1929. Serial No. 330,952.

Our invention relates broadly to the reproduction of sound and more particularly to a system for reproducing sound from a photographic sound record.

One of the objects of our invention is to provide a system or apparatus for sound reproduction in which a sound record is photographed in a spiral path upon a disk or plate which is rotatably driven, and a light sensitive cell subjected to variations in light intensity in accordance with the movement of the sound record for controlling a sound reproducing system in accordance therewith.

Another object of our invention is to provide a practical construction of sound reproducing system employing a photographic sound record which is encased in a protective enclosure and arranged to be rotatably driven for cooperation with a light sensitive cell which may be moved in a path for searching the photographic record.

Still another object of our invention is to provide a construction of closure for a disk shaped photographic sound record, which closure may be readily mounted upon or removed from a phonograph operating in cooperation with a photoelectric cell and a searching device which may be moved at a speed proportional to the rate of rotation of the photographic sound record.

A further object of our invention is to provide a mounting for a photographic sound record within a protective closure by which the photographic record may be driven by the usual phonograph with respect to a photoelectric cell searching system for the reproduction of sound from the photographic record.

Other and further objects of our invention reside in the construction of the photographic sound reproducing apparatus set forth in more detail in the specification hereinafter following and illustrated in the accompanying drawings wherein:

Figure 1 is a cross-sectional view taken through a phonograph showing the mounting of the photographic record device of our invention thereon and illustrating the arrangement of the photoelectric cell searching system which is driven adjacent the photographic record; Fig. 2 is a cross-sectional view through the photographic sound record apparatus illustrated in Fig. 1 and showing the system of driving the photo-electric cell at a rate of speed proportional to the movement of the sound record; Fig. 3 is a fragmentary plan view of the casing which encloses the photographic sound record and illustrating the arrangement of the photoelectric cell searching device with respect to the sound record; Fig. 4 is a cross-sectional view taken through the casing of the photographic record device illustrated in Fig. 2; Fig. 5 is a side elevation of the casing which encloses the photographic record partially broken away to show the photographic record interiorly of the casing; Fig. 6 is a theoretical view illustrating the manner in which the sound is photographed on the photographic record; and Fig. 7 is a fragmentary view of a portion of the photographic record illustrating the sound recorded thereon in spiral paths.

The system of reproducing sound in accordance with our invention is to be distinguished from systems of sound reproduction now in use which employ a photographic film strip on which a sound record is recorded. We provide a flat disk on which the sound is recorded in a spiral path. Each sound record is carefully protected by an enclosing casing which closely conforms to the contour of the sound record and provides a support for the sound record which may be rotatably driven by mounting the record upon the rotatable shaft of a phonograph. We provide a mounting having a photo-electric cell and light beam projector which is driven laterally of the sound record at a speed proportional to the rate of rotation of the sound record for searching the record and controlling an electrical sound reproducing system.

Referring to the drawings in more detail, reference character 1 illustrates a phonograph in which there is housed a motor system 2 having a projecting shaft 3 which drives the spindle 4. A suitable hub 5 is positioned upon shaft 3 and serves to support the casing which encloses the photographic sound record. The casing comprises a pair of thin sheet metal members 6 and 7 which are united at their peripheries by an overlapping joint represented at 8 forming a substantially light proof casing but sufficiently flexible to be readily separable. An annular frame member 9 is provided interiorly of the casing having a depending shoulder 10 thereon around which the portion 6 of the casing is gripped. The upper face of the annular frame 9 is provided with a raceway 11 for ball-bearing members 12. An independent annular frame 14 is provided having an annular raceway 15 thereon serving to cooperate with the ball-bearings 12. The annular frame 14 has an upstanding peripheral flange 16 thereon which rotates with concentric hub members 18 which grip the peripheral edge 19 of the photographic sound record 20. The photographic sound record 20 is in the form of a disc of transparent material such as cellulose or glass having a photographic record thereon. A hub member 21 is provided at the center of the photographic sound record 20, and is arranged to be positively rotated by shaft member 3 by reason of the lock established through keyway 22. Suitable securing means such as a nut member 23 may be provided for cooperation with the hub member 21 for supporting the sound record 20. The lower portion of the casing at 6 rests upon frame 5 and remains stationary thereon, while the sound record record interiorly of the casing is driven through spindle 4. The photo-electric cell is represented at 24 as housed within a casing 25 from a rotatable member 27 at one side of the phonograph. An arcuate shaped slot 45 is provided at the lower wall 6 of the casing enabling movement of the photo-electric cell directly adjacent the sound record 20. The rotatable member 27 is journaled upon a bracket member 28 secured to one side of the phonograph as represented at 29. A spindle 30 is journaled in bracket 28 and has a gear 31 at one end thereof meshing with a system of gears 32 which are driven through a train of reduction gears, represented generally at 33, in proportion to the speed of rotation of spindle 4. The upper extremity of shaft member 30 is substantially cone shaped, as represented at 34 and provides a friction grip with sleeve member 27, the frictional force being releasable by means of thumb screw 35. An arm 36 extends from the upper portion of sleeve 27 and has a member 37 hinged thereto as represented at 38. The member 37 carries a light beam projecting device represented at 39 which extends through a slot 40 formed in the upper portion of casing 7 enabling a needle ray of light to be projected through the sound record 20 and through the individual spiral rows of sound recorded thereon, as represented at 41 in Figs. 6 and 7, for variably controlling the operation of photo-electric cell 24. The photo-electric cell 24 is connected at the input circuit of an electron tube amplification system represented at 42 which is coupled with any desired number of stages of amplification represented at 43 for the control of loud speaker system 44 and the reproduction of sound in accordance with the record on sound record 20.

It will be observed that the sound record is readily removable from the phonograph by elevating arm 37, removing the flat casing enclosing the sound record therein and placing a new record thereon.

The arcuate shaped slots 40 and 45 in the casings 6 and 7 are of such small size as not to permit entrance of dust, foreign matter or any substantial amount of light to the sound record.

While we have described our invention in one of its preferred embodiments, we desire that it be understood that modifications may be made and that no limitations upon our invention are intended other than are imposed by the scope of the appended claims.

What we claim as new and desire to secure by Letters Patent of the United States is as follows:

1. A sound reproducing system comprising a rotary mechanism, a casing arranged to be mounted downwardly upon said rotary mechanism, an annular raceway positioned around the interior periphery of said casing, a photographic sound record having its outer periphery terminating in an annular member rotatable with respect to said raceway, a photo-electric cell projecting through one side of said casing to a position adjacent said photographic sound record, a light beam projecting device extending through the opposite side of said casing to a position adjacent said photographic sound record, and means for simultaneously shifting said photo-electric cell and light beam projecting device at a speed proportioned to the rate of rotation of said photographic sound record.

2. In a sound reproducing system a casing comprising a pair of interlocked metallic members, an annular track positioned interiorly of said metallic members adjacent the interior periphery thereof, a rotatable annular member cooperating with said annular track and mounted for rotation with respect thereto, a central rotatable spindle and a photographic sound record mounted on said central rotatable spindle and said rotatable annular member, a photo-electric cell extending through one side of said casing to a position adjacent said photographic sound record and movable in proportion to the speed of rotation of said photographic sound record.

In testimony whereof we affix our signatures.

JOHN O. PRESCOTT.
FREDERICK A. KOLSTER.